United States Patent
Kim

(10) Patent No.: US 10,023,023 B2
(45) Date of Patent: Jul. 17, 2018

(54) COWL CROSS ASSEMBLY STRUCTURE FOR VEHICLE

(71) Applicant: Hyundai Motor Company, Seoul (KR)

(72) Inventor: Hye Kyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 34 days.

(21) Appl. No.: 15/214,988

(22) Filed: Jul. 20, 2016

(65) Prior Publication Data

US 2017/0120955 A1     May 4, 2017

(30) Foreign Application Priority Data

Oct. 28, 2015    (KR) ................. 10-2015-0149949

(51) Int. Cl.
| | |
|---|---|
| *B60H 1/00* | (2006.01) |
| *B62D 25/14* | (2006.01) |
| *B60H 1/26* | (2006.01) |
| *B62D 29/04* | (2006.01) |

(52) U.S. Cl.
CPC ........... *B60H 1/00564* (2013.01); *B60H 1/26* (2013.01); *B62D 25/142* (2013.01); *B62D 25/145* (2013.01); *B62D 29/043* (2013.01); *B60H 2001/006* (2013.01)

(58) Field of Classification Search
CPC ............ B60H 1/00557; B60H 1/00564; B62D 25/142; B62D 25/145
USPC .................. 296/72, 190.09, 193.02
See application file for complete search history.

(56) References Cited

U.S. PATENT DOCUMENTS

| | | | |
|---|---|---|---|
| 6,644,722 B2* | 11/2003 | Cooper .................. | B29C 49/20 |
| | | | 29/897.2 |
| 6,988,764 B2* | 1/2006 | Matsutani ............ | B62D 25/142 |
| | | | 180/90 |
| 2005/0001450 A1* | 1/2005 | Cooper ................ | B62D 25/145 |
| | | | 296/193.02 |
| 2005/0285433 A1 | 12/2005 | Baudouin | |
| 2006/0017309 A1 | 1/2006 | Wolf | |

FOREIGN PATENT DOCUMENTS

| | | |
|---|---|---|
| JP | 2002-504039 A | 2/2002 |
| JP | 2003-136942 A | 5/2003 |
| JP | 2003-528000 A | 9/2003 |
| JP | 2006-256379 A | 9/2006 |
| KR | 20-1998-0042362 U | 9/1998 |
| KR | 2006-0062096 A | 6/2006 |

* cited by examiner

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A cowl cross assembly structure for a vehicle is provided. The cowl cross assembly structure includes a cowl cross bar which is connected horizontal at left and right sides between front pillars of a vehicle and a duct which passes through an aperture of a bracket which has been installed at the cowl cross bar and is integrally formed with the cowl cross bar. A fixing member is included on an exterior circumferential surface thereof to fix an installation position within the interior of the through hole.

7 Claims, 5 Drawing Sheets

COWL CROSS ASSEMBLY STRUCTURE FOR VEHICLE

CROSS-REFERENCE TO RELATED APPLICATION

This application claims under 35 U.S.C. § 119(a) the benefit of priority to Korean Patent Application No. 10-2015-0149949 filed on Oct. 28, 2015, the entire contents of which are incorporated herein by reference.

BACKGROUND (a) Technical Field

The present disclosure relates to a cowl cross assembly structure for a vehicle, and more particularly, to a cowl cross assembly structure for a vehicle that reduces noise and vibration which occur at a duct and improves an air conditioning performance of the duct.

(b) Background Art

Generally, a cowl cross bar is a structure installed side by side in a horizontal direction at a lower side of a dash panel of a vehicle body and is disposed orthogonal to a steering column of the vehicle and is fixedly coupled via a mounting bracket fixed at a side interior panel. The assembling structure and strength of a cowl cross bar have a substantial effect on increasing the strength of the vehicle body. A bracket which is suitable to maintain an air conditioning apparatus to input external air into the vehicle or a steering column are installed.

Moreover, the cowl cross bar is able to fix the steering column to the vehicle body at a boundary portion between an engine compartment of the vehicle and the interior of the vehicle body, and to support the duct of a cooling and heating air conditioning apparatus. However, since the cowl cross bar and the duct are disposed above and below, installation space may be limited when a Head Up Display (HUD) is installed within the vehicle. Due to the space limitation, the duct volume needs to be reduced. Accordingly the air conditioning performance of the vehicle may be degraded because of the duct volume.

The above information disclosed in this section is merely for enhancement of understanding of the background of the invention and therefore it may contain information that does not form the prior art that is already known in this country to a person of ordinary skill in the art.

SUMMARY

The present invention provides a cowl cross assembly structure for a vehicle that removes an additional duct installation space to fixedly install a duct that passes through the interior of a bracket of a cowl cross bar, and increases the volume of the duct.

In one aspect, the present invention provides a cowl cross assembly structure for a vehicle which may include a cowl cross bar horizontally coupled at left and right sides between front pillars of a vehicle, and a duct that passes through an aperture of a bracket, installed at the cowl cross bar, and is integrally formed with the cowl cross bar. Further, a fixing member may be disposed on an exterior circumferential surface thereof may be configured to fix an installation position within the interior of the through hole.

In some aspects of the invention, a pair of fixing members may be spaced apart from each other at a regular interval along the longitudinal direction of the duct. A pair of engaging members may be disposed on an interior circumferential surface of the bracket at the same regular interval and a protrusion may be inserted and engaged the fixing member. The fixing member may include an engaging region with a predetermined width that corresponds to the width of the engaging member and may be configured to fix the position of the engaging member upon insertion of the engaging member. Moreover, the engaging region may be formed in either a U-shape or a V-shape.

Furthermore, the fixing member may be made of a soft material, for example, silicon, rubber, etc. Additionally, the duct may be formed divided into a plurality of regions (e.g., three regions), which have different shapes, in the longitudinal direction thereof.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
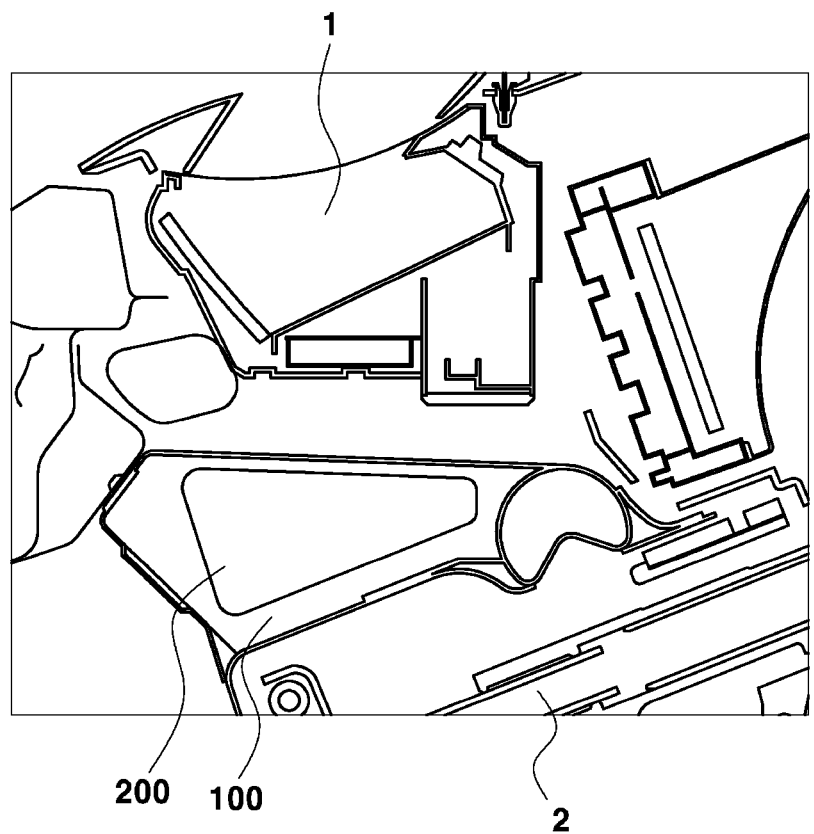
FIG. 1 is an exemplary view schematically illustrating a cowl cross assembly structure for a vehicle according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
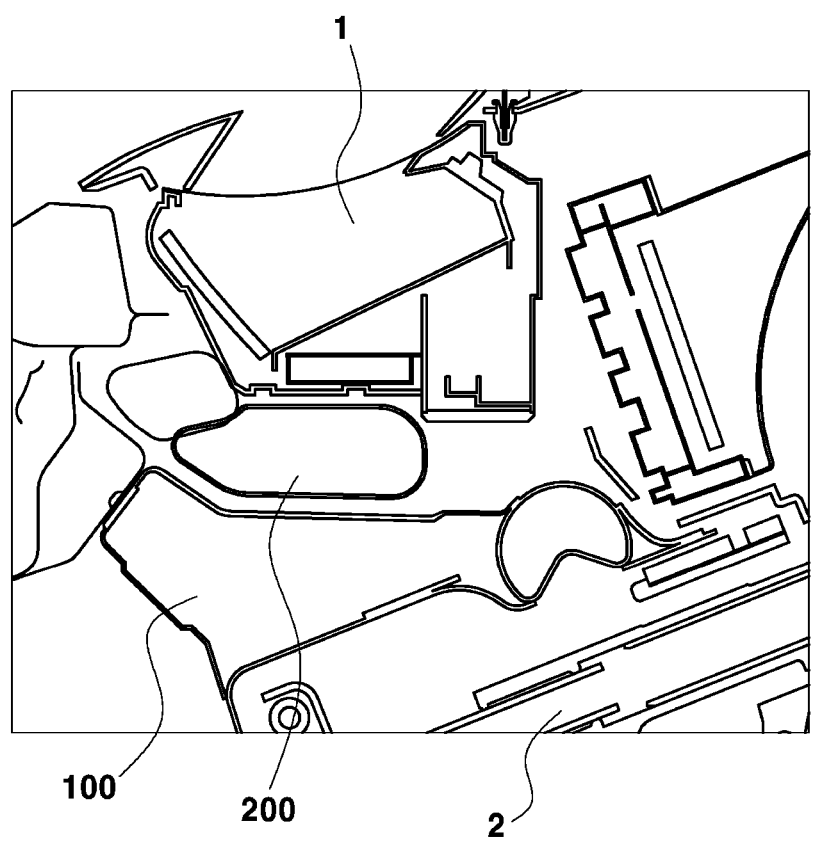
FIG. 2 is an exemplary view schematically illustrating a cowl cross assembly structure for a typical vehicle of the related art.

FIG. 1 is an exemplary view schematically illustrating a cowl cross assembly structure for a vehicle according to an exemplary embodiment of the present invention. FIG. 2 is an exemplary view schematically illustrating a cowl cross assembly structure for a typical vehicle. As illustrated in FIG. 1, the cowl cross assembly structure for a vehicle may include a cowl cross bar 100 and a duct 200. In particular, the cowl cross bar 100 may be provided to protect the passenger within a vehicle by absorbing a lateral collision impact of the vehicle and may generally be formed from a steel material in a shape of a hollow pipe. The cowl cross bar 100 may be coupled horizontally at left and right sides between the front pillars of the vehicle. A center support bar (not illustrated) may be vertically connected between a central portion of the cowl cross bar 100 and the dash panel of the vehicle.

More specifically, the cowl cross bar 100 may be disposed in the horizontal direction at the left and right sides of the vehicle body in front of the driver's seat and passenger seat and may be fixedly coupled to the interior panel of the front pillar of the vehicle with the a cowl cross bar mounting bracket (not illustrated), that may be formed from a steel material, and may be coupled at both sides thereof. Various devices such as a fuse box, an audio mounting bracket, etc., installed at a front side of the vehicle may be coupled to the cowl cross bar 100.

As illustrated in FIG. 2, the duct 200 may be arranged in the upward and downward directions on the top of the cowl cross bar 100. According to the structure of the cowl cross assembly of a typical vehicle of the related art, the Head Up Display (HUD) 2, the duct 200, the cowl cross bar 100 and the steering column 1 are disposed in the upward and downward directions as shown in FIG. 2. For example, since the duct 200 is fitted in the cavity (e.g., area of the space) between the HUD 2 and the cowl cross bar 100, the volume of the within the interior of the duct 200 may decrease and the air conditioning performance may be degraded.

Recently, vehicles have been developed to include an increased size of the HUD 2 is due to the improvement of the performance of the HUD 2. For example, the augmented reality function, etc., requires adjustments to the structure of the cowl cross assembly for the vehicle. In other words, the cowl cross assembly for the vehicle according to the exemplary embodiment of the present invention may include a structure where the HUD 2 and the cowl cross bar 100 are arranged to pass through the interior of the duct 200, and the steering column 1 may be arranged as shown in FIG. 2. Accordingly, a desired installation space of the duct 200 may be obtained irrespective of an increase in the size of the HUD 2.

Consequently, the cowl cross assembly structure for the vehicle according to the present exemplary embodiment may include the duct 200 and the cowl cross bar 100 integrally formed via insertion of the duct 200 into the bracket 110 which has been previously installed at the cowl cross bar 100. Accordingly, the volume of the duct 200 may be increased and the air conditioning performance of the duct 200 may be enhanced.

Figure 3:
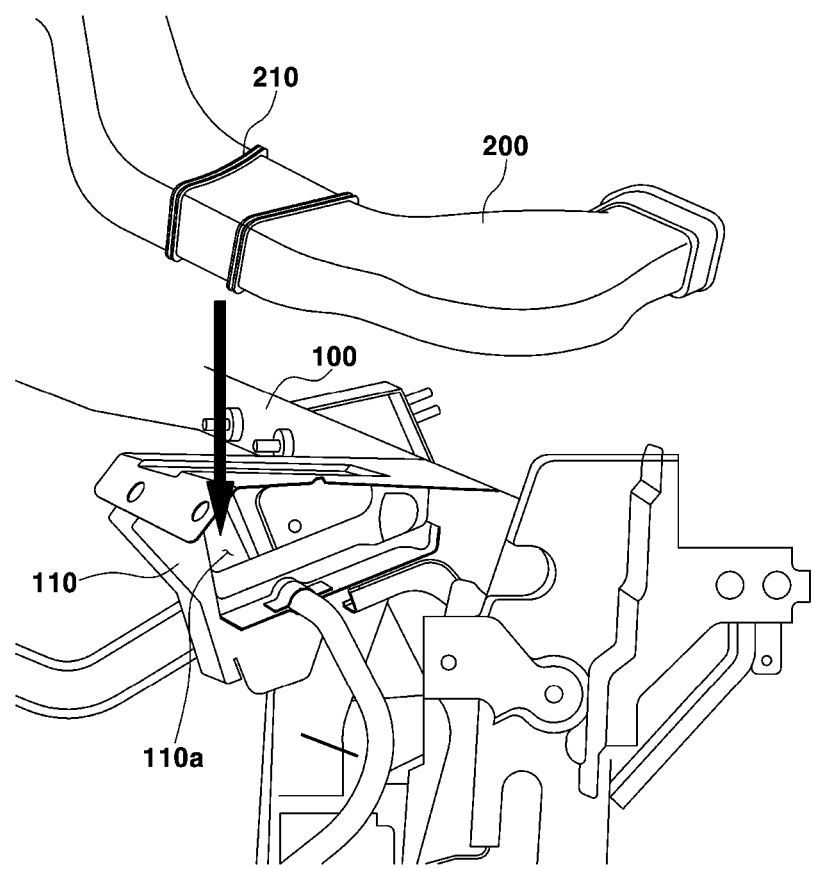
FIG. 3 is an exemplary view illustrating a state before a duct of a cowl cross assembly structure for a vehicle is installed according to an exemplary embodiment of the present invention.
Figure 4:
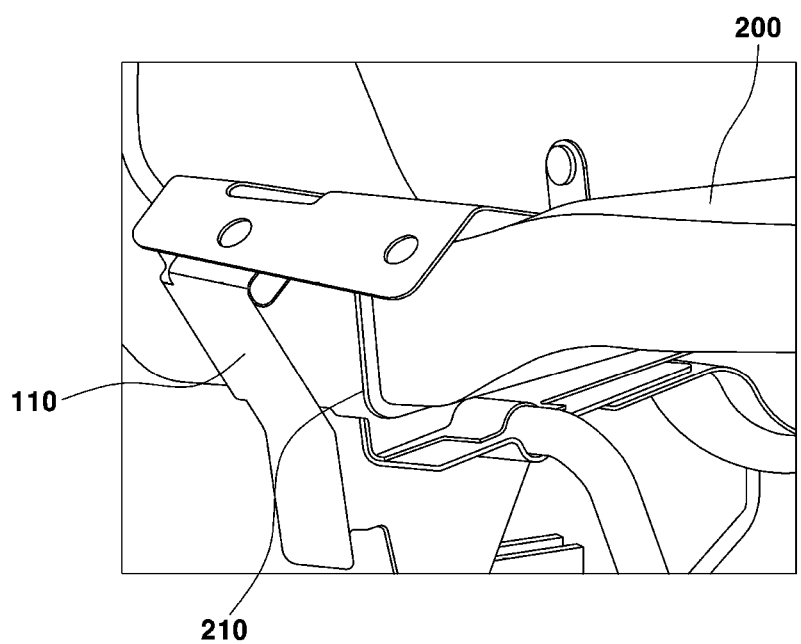
FIG. 4 is an exemplary view illustrating a state after a duct of a cowl cross assembly structure for a vehicle is installed according to an exemplary embodiment of the present invention.
Figure 5:
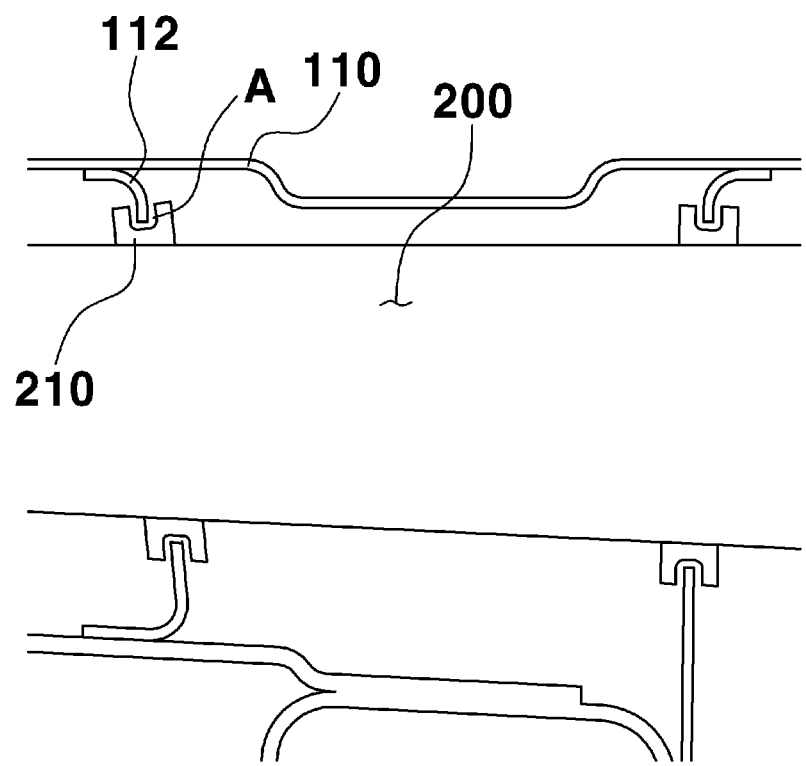
FIG. 5 is an exemplary view illustrating a cross section of a cowl cross bar which shows a state after a duct of a cowl cross assembly structure for a vehicle is installed according to an exemplary embodiment of the present invention.

FIG. 3 is an exemplary view illustrating an arrangement prior to the installation of a duct of a cowl cross assembly structure for a vehicle according to an exemplary embodiment of the present invention. FIG. 4 is an exemplary view illustrating an arrangement after installation of a duct of a cowl cross assembly structure for a vehicle according to an exemplary embodiment of the present invention. FIG. 5 is an exemplary view illustrating a cross-section of a cowl cross bar which shows an arrangement after installation of a duct of a cowl cross assembly structure for a vehicle according to an exemplary embodiment of the present invention.

As illustrated in FIG. 3 to FIG. 5, the cowl cross assembly structure for the vehicle may be installed to allow the duct 200 to pass through the interior of the cowl cross bar 100. More specifically, the duct 200 may include a predetermined length and may pass through an aperture 110a of the bracket 110 which has been previously installed at the cowl cross bar 100 and may be integrally formed with the cowl cross bar 100.

In some exemplary embodiments, the duct 200 may be formed to be divided into three regions which may have different bent shapes in the longitudinal direction. In other words, the shape of the duct 200 may be adjusted based on the position of a crash pad (not illustrated) installed within the interior of the vehicle body. When the duct 200 is formed in the form of one integral type duct 200, the installation thereof may be difficult due to interference with other components. Conversely, the duct 200 according to the present invention may be formed to be divided into three regions. Since the three regions may be formed in the different bent shapes within a range to provide avoidance of interference with other components, the duct 200 may be installed easily.

Moreover, the duct 200 may include a fixing member 210 disposed an exterior circumferential surface thereof and may be configured to fix the installation position of the duct 200 within the interior of the through hole 110a. A pair of the fixing members 210 may be spaced apart from each other at a regular interval in the longitudinal direction of the duct 200.

Further, a pair of ring-shaped engaging members 112 may be disposed on an interior circumferential surface of the bracket 110 with the same interval as the above-mentioned spaced-apart interval and may be formed inserted in the fixing member 210 of the duct 200 positioned within the interior of the through hole 110a. At the fixing member 210, an engaging region (A) may be formed and may have predetermined width that corresponds to the width of the engaging member 112. For example, an end portion of the engaging member 112 may be fixed in a position when the engaging member 112 is inserted into the fixing member 210.

The engaging region (A) may have the form of a groove with a cross section of either a U-shape or a V-shape. When the engaging region (A) has an aperture shape, the end portion of the engaging member 112 may directly contact an exterior circumferential surface of the duct 200 and vibrations may occur. The engaging member 112 may collide with the duct 200, which may result in damage to the duct 200. In the present exemplary embodiment, the cross section shape of the engaging region (A) may be limited to the U-shape or the V-shape, however such a shape merely provided for illustrative purposes. For example, grooves having variously shaped cross sections may be used.

Furthermore, the fixing member 210 may be formed from a soft material, for example, silicon, rubber, etc. Since damage to the duct by an impact caused by friction may be prevented when the fixing member 210 and the engaging member 112 are coupled to each other to fix the position of the duct 200 in an arrangement where the duct 200 is disposed on the through hole 110a. When the fixing member 210 is formed from the same material as the soft material, the impact may be reduced when the fixing member 210 collides with the engaging member 112 due to the vibration of the vehicle body. Accordingly, the vibrations and noise may be effectively reduced.

Consequently, according to the present exemplary embodiment, during installation when the duct 200 passes through the through hole 110a of the bracket 110, the duct 200 may be more easily assembled to the cowl cross bar 100. For example, the engaging member 112 and the fixing member 210 may be disposed on an interior circumferential surface of the bracket 110 and on an exterior circumferential surface of the duct 200. The position of the duct 200 may be fixed with the aid of the engagement between the engaging member 112 and the fixing member 210.

In the present invention, since the duct may be fixedly installed passing through the interior of the bracket of the cowl cross bar, an additional duct installation space may be omitted. Accordingly, the available space may be maximized, and the volume of the duct may also be effectively increased. Moreover, the position of the duct may be fixed and the more duct may be easily assembled since a member made of a soft material, for example, silicon, rubber, etc. may be installed on an exterior circumferential surface of the duct where the cowl cross bar and the duct meet each other.

The present invention may increase the volume of a duct and maximize an applicable space since an additional duct installation space may be removed to allow the duct to be fixedly installed by passing through the interior of the bracket of the cowl cross bar. Moreover, the present invention may provide an improved assembly of the duct while fixing the position of the duct to allow a soft member, for example, silicon, rubber, etc. to be disposed on an exterior circumferential surface of the duct where the cowl cross bar and the duct meet each other.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A cowl cross assembly structure for a vehicle, comprising:
   a cowl cross bar coupled horizontal at left and right sides between front pillars of a vehicle; and
   a duct configured to pass through an aperture of a bracket, installed at the cowl cross bar, and is integrally formed with the cowl cross bar and includes a fixing member on an exterior circumferential surface thereof to fix an installation position within the interior of the aperture,
   wherein an engaging member is disposed on an interior circumferential surface of the bracket and includes a protrusion configured to be inserted and coupled into the fixing member.

2. The structure of claim 1, wherein the fixing member is formed as a pair spaced apart from each other at a regular interval in the longitudinal direction of the duct, and a pair of engaging members is disposed on an interior circumferential surface of the bracket at the same regular interval.

3. The structure of claim 2, wherein the fixing member includes an engaging region which has a predetermined width that corresponds to the width of the engaging member within the interior thereof and is configured to maintain the position of the engaging member in a fixed position upon insertion of the engaging member.

4. The structure of claim 3, wherein the engaging region is formed in a U-shape or a V-shape.

5. The structure of claim 1, wherein the fixing member is made of a soft material.

6. The structure of claim 1, wherein the duct is formed divided into three regions, which have different shapes, in the longitudinal direction of the duct.

7. The structure of claim 5, wherein the fixing member is disposed on an exterior circumferential surface of the duct where the cowl cross bar and the duct intersect each other.

* * * * *